United States Patent [19]
Inoue et al.

[11] 3,947,855
[45] Mar. 30, 1976

[54] ELECTRIC SHUTTER MEANS WITH BATTERY CHECKING CIRCUIT

[75] Inventors: Nobuyoshi Inoue, Kawagoe; Kenta Namioka, Tokyo, both of Japan

[73] Assignee: Copal Company Limited, Tokyo, Japan

[22] Filed: May 6, 1975

[21] Appl. No.: 574,942

[30] Foreign Application Priority Data
May 10, 1974 Japan.............................. 49-52806

[52] U.S. Cl................ 354/50; 354/60 R; 354/60 L; 354/234
[51] Int. Cl.²........................................... G03B 7/08
[58] Field of Search........ 354/60 R, 60 E, 60 L, 50, 354/51, 48, 234–235, 258, 266–268

[56] References Cited
UNITED STATES PATENTS

| 3,646,859 | 3/1972 | Umenura | 354/60 E |
| 3,661,062 | 5/1972 | Wisst | 354/60 L |
| 3,812,504 | 5/1974 | Wagensonner et al | 354/60 L |

*Primary Examiner*—L. T. Hix
*Assistant Examiner*—James LaBarre
*Attorney, Agent, or Firm*—Cushman, Darby & Cushman

[57] ABSTRACT

An electric shutter means which comprises a voltage checking circuit connected to an exposure time control circuit including an electromagnet for controlling the time of closing shutter blades so that, when the voltage of a power source battery for said exposure time control circuit has dropped to be below a predetermined level, the passage of electricity to said electromagnet may be forcibly interrupted by said voltage checking circuit.

3 Claims, 2 Drawing Figures

ELECTRIC SHUTTER MEANS WITH BATTERY CHECKING CIRCUIT

BACKGROUND OF THE INVENTION a. Field of the Invention

The present invention relates to electric shutter means, and more particularly to an electric circuit to be applied to an electric shutter arranged so that, when the power source voltage has dropped to be below a predetermined level, the exposure time may be mechanically controlled with a specific shutter speed.

b. Description of the Prior Art

A camera equipped with an electric shutter is generally provided with a voltage checking means. An electric shutter of a system wherein, when the voltage of a power source battery has dropped to be below a predetermined level and an electromagnet to control the time of closing shutter blades is no longer well energized, the exposure time will be automatically switched to be mechanically controlled with a specific shutter speed has been suggested, for example, by U.S. Pat. No. 3,777,646 and others.

However, in the electric shutter of this system, the judgement of whether the exposure time is to be controlled by an electronic means or to be controlled by a mechanical means depends on whether the attraction of the electromagnet is sufficient or not, therefore the switching time is unstable and, as a result, there have been defects that, though the voltage checking means indicates that the power source voltage has dropped to be below a predetermined level, the exposure time will not be switched to be controlled by the mechanical means and that, though the voltage checking means indicates that the power source voltage is above the predetermined level, the exposure time will be controlled with a specific shutter speed by the mechanical means. This fact is likely to give an unnecessary confusion to the photographer and to lead the photographing to a failure.

SUMMARY OF THE INVENTION

Therefore, a primary object of the present invention is to provide an electric shutter means arranged so that, when a voltage checking means indicates that the voltage of a power source battery has dropped to be below a predetermined value, the exposure time may be positively switched to be controlled at a specific shutter speed by a mechanical means.

Another object of the present invention is to provide an electric shutter means made so that a voltage checking means may accurately check the voltage of a power source battery as it is while being used.

According to the present invention, the above mentioned objects can be attained by connecting a voltage checking circuit with an exposure time control circuit and pre-setting the check level of the voltage checking circuit so as to be somewhat higher than the voltage level of the limit at which an electromagnet can operate properly so that, when the voltage of a power source battery has come to be below the above mentioned check level, the passage of electricity to the above mentioned electromagnet may be forcibly interrupted by a signal issued from said voltage checking circuit.

DESCRIPTION OF THE PREFERRED EMBODIMENTS

Figure 1:
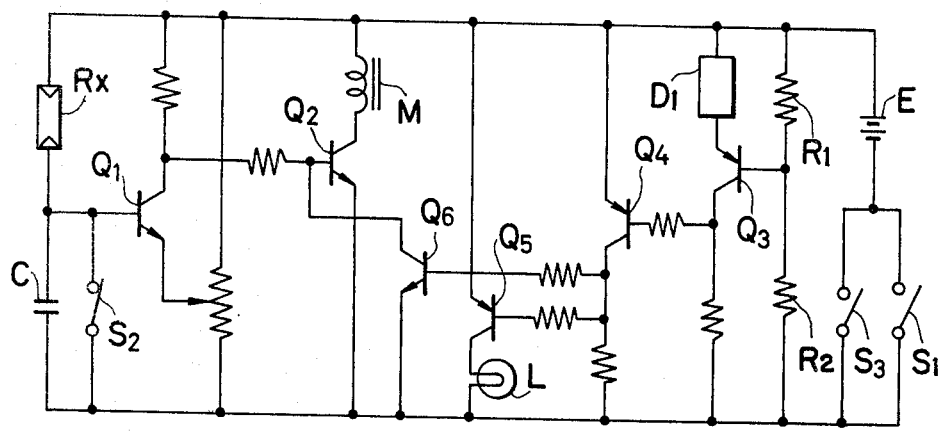
FIG. 1 is a circuit diagram showing an embodiment of the electric shutter means according to the present invention.

First of all, in FIG. 1, reference symbol E signifies a power source battery, symbol $S_1$ signifies a power source switch, symbols C and Rx signify respectively a condenser and photoconductive element forming a CR delay circuit for controlling the exposure time, symbol $S_2$ signifies a switch for starting the operation of said delay circuit, symbol $Q_1$ signifies a switching transistor, symbol $Q_2$ signifies an amplifying transistor, symbol M signifies an electromagnet for controlling the exposure time and the above components are of a formation of an exposure time control circuit of a very common electric shutter. Symbols $R_1$ and $R_2$ signify resistors for dividing the power source voltage E, symbol $D_1$ signifies such constant voltage element as, for example, a Zener diode, symbol $Q_3$ signifies a switching transistor for checking the power source voltage E, symbols $Q_4$ and $Q_5$ signify amplifying transistors, symbol L signifies a lamp for indicating the state of the power source voltage E and the above components form a voltage checking circuit. Symbol $S_3$ signifies a voltage checking switch for operating said voltage checking circuit independently and singly. Symbol $Q_6$ signifies an amplifying transistor by whose on-operation the transistor $Q_2$ is forcibly switched off so that no current may flow to the electromagnet M.

By the way, the electromagnet M will attract and hold a shutter closing control member when energized, will be de-energized after a time determined by the above mentioned CR delay circuit has elapsed and will serve to control the exposure time. However, in case the power source voltage E becomes below a certain level and the electromagnet M can no longer attract and hold the control member, a mechanical mechanism for controlling the exposure time of the shutter with a specific shutter speed will be automatically operated. By the way, this kind of electric shutter mechanism, that is, an electric shutter mechanism arranged so that, when the voltage of a power source battery has dropped to be below a predetermined level, the exposure time may be automatically switched so as to be mechanically controlled with a specific shutter speed is disclosed in detail, for example, in U.S. Pat. No. 3,777,646 and therefore shall not be particularly explained here.

Further, the values and characteristics of the resistors $R_1$ and $R_2$, constant voltage element $D_1$ and transistor $Q_3$ are so selected that, in case the voltage somewhat higher than the voltage of the limit at which the above mentioned electromagnet M can operate properly is $V_M$, the Zener voltage of the constant voltage element $D_1$ is $V_D$, the voltage between the base and emitter of the transistor $Q_3$ is $V_{BE}$ and the divided voltage at the connecting point of the resistors $R_1$ and $R_2$ is $V_R = (R_1 E/(R_1 + R_2))$, when the power source voltage E is higher than the voltage $V_M$, $V_R > V_D + V_{BE}$ and the transistor $Q_3$ may be on and, when the power source voltage E is lower than $V_M$, $V_R < V_D + V_{BE}$ and the transistor $Q_3$ may be off.

Therefore, when the power source switch $S_1$ is closed in the initial stage of the releasing operation of the camera, in case the power source voltage E is higher than the above mentioned voltage $V_M$, as described above, due to the relation of $V_R > V_D + V_{BE}$, the transistor $Q_3$ will be on, therefore the transistor $Q_4$ will be off, the transistor $Q_5$ will be on and the transistor $Q_6$ will be off. In case the transistor $Q_6$ is off, the operation of the voltage checking circuit will have no influence at all on the exposure time control circuit. Further, when the transistor $Q_5$ is on, the lamp L will light to indicate that the power source voltage E is of a value sufficient to be able to properly operate the electromagnet M, that is to say, that the exposure time is properly controlled by the inherent operation of the electric shutter.

In case the power source voltage $E$ is lower than the reference voltage $V_M$, as described above, due to the relation of $V_R < V_D + V_{BE}$, the transistor $Q_3$ will be off, therefore the transistor $Q_4$ will be on, the transistor $Q_5$ will be off and the transistor $Q_6$ will be on. When the transistor $Q_6$ is thus on, the base potential of the transistor $Q_2$ will be dropped to the zero level, therefore the transistor $Q_2$ will not be able to be on independently of the state of the exposure time control circuit and no electricity will be passed to the electromagnet. As a result, the electromagnet will not be energized at all, the exposure time will be switched to be controlled by a mechanical means in the course of the releasing operation and the shutter blades will be opened and closed at a specific shutter speed. When the transistor $Q_5$ is off, the lamp L will not light and will indicate that the power source voltage E is so low that the exposure time is not controlled by the inherent electronic means of the electric shutter but is controlled at a specific shutter speed by a mechanical means.

Further, by the operation of the voltage checking switch $S_3$, the state of the power source voltage E and whether the exposure time is controlled by the electronic means or is controlled by the mechanical means can be known before the releasing operation.

Figure 2:
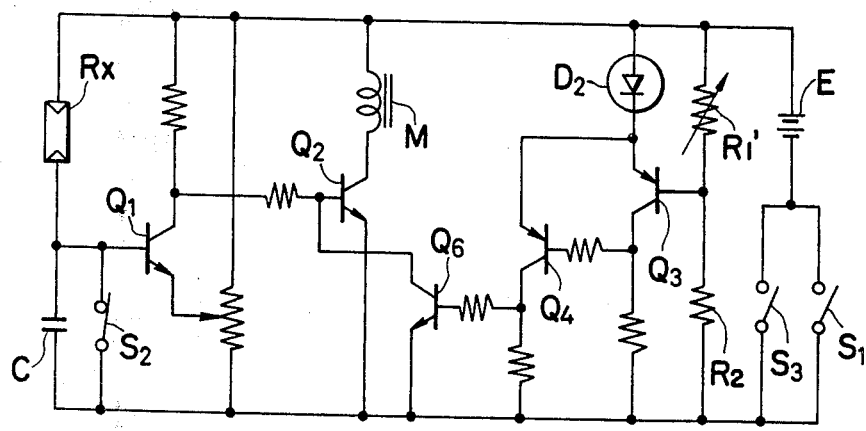
FIG. 2 is a circuit diagram showing another embodiment of the present invention.

In the embodiment in FIG. 2, a luminous diode $D_2$ is used as an indicating element and is provided also with a function as of a constant voltage element by utilizing its joint voltage and a variable resistor $R_1$ is used for the correction of the fluctuation of the characteristic of said luminous diode $D_2$. The same symbols are attached respectively to the other elements operating the same as in FIG. 1 and their operations are substantially the same as in the embodiment in FIG. 1 and therefore shall not be particularly explained.

By the way, the operation in the case that the power source voltage E is a little higher than the proper operation limit voltage shall be explained with FIG. 2 as an example.

First of all, as the electromagnet M (coil) which is a retarding component is included in the control circuit formed of the transistors $Q_1$ and $Q_2$, the responding speed of the voltage checking circuit formed of the transistors $Q_3$, $Q_4$ and $Q_6$ is higher than of the above mentioned control circuit.

Therefore, in such case that the power source voltage E is a little higher than the operation limit voltage, in the initial period of closing the switch $S_3$, the luminous diode $D_2$ will light but electricity will be passed to the electromagnet M somewhat later, therefore the load current of the power source will increase and the voltage between the terminals of the power source battery will reduce. When the power source voltage E becomes lower than the operation limit voltage, the transistor $Q_3$ will be off and the luminous diode $D_2$ will be out. On the other hand, when the transistor $Q_3$ is off, the transistor $Q_6$ will be on, the transistor $Q_2$ will be off and therefore the passage of electricity to the electromagnet M will be interrupted. As a result, the load current of the power source will quickly reduce and the voltage between the terminals of the power source battery will again rise and, when it becomes higher than the operation limit voltage, the luminous diode $D_2$ will again light. Therefore, when the power source voltage E approaches the usable limit voltage, the above mentioned operation will be repeated and the luminous diode $D_2$ will flicker to be able to positively inform the photographer that the power source battery will soon become unusable. Therefore, the embodiment in FIG. 2 will be effective particularly in the case of using a battery (such as, for example, an alkali battery) wherein the discharge characteristic has a diminishing characteristic.

We claim:

1. An electric shutter means comprising an exposure time control circuit including an electromagnet for controlling the movement of closing shutter blades, a voltage checking circuit connected to said exposure time control circuit, a power source battery connected to said exposure time control circuit and voltage checking circuit, a power source switch connected between power source battery and said circuits and capable of simultaneously bringing said exposure time control circuit and voltage checking circuit into an operating condition, and interrupting means responsive to a checking signal issued from said voltage checking circuit when the voltage of said power source battery has dropped to be below a predetermined level for forcibly interrupting the passage of electricity to said electromagnet.

2. An electric shutter means according to claim 1, in which said voltage checking circuit includes an indicating lamp and a constant voltage element.

3. An electric shutter means according to claim 1, in which said voltage checking circuit includes a luminous diode and a variable resistor connected to said luminous diode.

* * * * *